United States Patent
Sigurdsson et al.

(10) Patent No.: US 7,644,416 B2
(45) Date of Patent: Jan. 5, 2010

(54) ACCESS TO A TARGET OBJECT WITH DESIRED FUNCTIONALITY

(75) Inventors: Johann Tomas Sigurdsson, Montreal (CA); Tomas Gunnarsson, Montreal (CA)

(73) Assignee: Google Inc., Mountain View, CA (US)

( * ) Notice: Subject to any disclaimer, the term of this patent is extended or adjusted under 35 U.S.C. 154(b) by 1086 days.

(21) Appl. No.: 11/057,322

(22) Filed: Feb. 10, 2005

(65) Prior Publication Data
US 2006/0179441 A1 Aug. 10, 2006

(51) Int. Cl.
*G06F 13/00* (2006.01)
(52) U.S. Cl. .................. 719/332; 719/311; 719/316; 719/328; 719/331
(58) Field of Classification Search .......... 719/311, 719/316, 328, 331, 332
See application file for complete search history.

(56) References Cited

U.S. PATENT DOCUMENTS

| | | | |
|---|---|---|---|
| 5,615,400 A * | 3/1997 | Cowsar et al. | 719/332 |
| 5,692,195 A | 11/1997 | Conner et al. | |
| 6,072,486 A * | 6/2000 | Sheldon et al. | 715/835 |
| 6,529,985 B1 | 3/2003 | Deianov et al. | |
| 6,714,942 B1 | 3/2004 | Westcott | |
| 6,895,581 B1 * | 5/2005 | Chkodrov et al. | 717/159 |
| 7,360,252 B1 * | 4/2008 | Torrubia-Saez | 726/27 |
| 2001/0037417 A1 | 11/2001 | Meyer | |

OTHER PUBLICATIONS

Microsoft Corporation, "Creating Custom Explorer Bars, Tool Bands, and Desk Bands", 2005 [online] [retrieved on May 16, 2005] Retrieved from the internet.
Microsoft Corporation, "IBandSite Interface", 2005 [online] [retrieved on May 16, 2005] Retrieved from the internet.
International Search Report and Written Opinion, PCT/US05/04525, Apr. 24, 1006.

* cited by examiner

*Primary Examiner*—Andy Ho
(74) *Attorney, Agent, or Firm*—Fenwick & West LLP

(57) ABSTRACT

A system and method provide access to a target object associated with a desired functionality. This is accomplished by creating an instance of a pre-existing object, replacing one or more functions of a table shared by all objects of the object's class, and triggering a call that ultimately causes the replacement functions to be called to allow access to the target object. The system includes software portions for enabling the method.

26 Claims, 8 Drawing Sheets

ACCESS TO A TARGET OBJECT WITH DESIRED FUNCTIONALITY

FIELD OF THE INVENTION

This invention relates generally to accessing software objects with a desired functionality and, more specifically, to accessing software objects to enable deskbands.

BACKGROUND OF THE INVENTION

In environments that rely on object-oriented systems, some software objects may not be directly accessible. However, one may want to access certain functionality associated with target objects that are not directly accessible to implement, enable, or otherwise make use of such functionality. For some such functionality, mechanisms for indirectly accessing the target objects may be unknown or obfuscated.

An example of one such desired functionality is the enablement of deskbands on graphical user interfaces (GUIs). A deskband is a type of taskbar object, which is dockable on the taskbar or floats on the screen and includes one or more deskband objects. A taskbar is a visual device on the desktop that typically shows the user which applications (tasks) are currently active and running. Clicking on one type of deskband object launches the application or file associated with the object. Another types of deskband allows text entry as part of a search. One advantage of using deskbands for applications or files is that they take up very little GUI space. In addition, deskbands may be displayed regardless of whether another application program is running, making them continuously accessible.

Creating deskbands for applications generally requires the end user to participate in the installation process. The installation process requires, for example, implementation of several interfaces and a special registration procedure. However, the steps involved in the installation process may be confusing to the user. In the Microsoft® Windows® 2000 operating system, a component object model (COM) interface exists for creating deskband objects; however, no known mechanism exists to get to the implementation of this interface without user interaction.

Prior deskband installations have attempted to remedy this problem by providing text or animated instructions for the user. However, such instructions require significant user involvement and time. Prior attempts to install deskbands without direct user interaction have included on-screen simulations of user actions. Such simulations have a substantial likelihood of failure due to inadvertent user interference with the process. In addition, these simulations create a flicker on the screen that is visible to the user during installation.

Thus, what is desired is a method that helps overcome one or more of the above-described limitations to provide access to objects associated with a desired functionality, for example, enablement of deskbands.

SUMMARY OF THE INVENTION

The present invention enables programmatic access to a target object, where there is otherwise no or limited access due to the design or implementation of the host operating system. Target objects include, for example, deskband objects, widgets, controls, and any other type of programmatic entity. In one embodiment, access to a target object is provided by creating an object of the same class as a pre-existing object. The pre-existing object's behavior is made up of functions in various procedure tables that store references to procedures of the object. The procedure tables are shared with all other class members, including the newly created object. At least one of the shared tables is modified by replacing one (or more) of the existing procedure references to an alternative procedure that provides access to the target object. From there, a call can be made to execute the alternative procedure to allow access to the target object.

In one embodiment of the invention, a method and system for accessing an object associated with enabling a deskband includes creating an object of the same class as a pre-existing object. The method also includes modifying one or more tables shared by the created object and the pre-existing object by replacing one or more entries with alternative procedures that provide access to the target object. Further, the method includes triggering a call that executes the alternative procedures to allow access to the object associated with enabling a deskband.

In one embodiment of the invention, a method and system for accessing a target object includes modifying one or more tables shared by the created object and the pre-existing object by replacing one or more entries with alternative procedures that emulate user actions to provide access to the target object. The method also includes triggering a call that executes the alternative procedures to allow access to the target object.

DETAILED DESCRIPTIONS OF THE PREFERRED EMBODIMENTS

The figures depict a preferred embodiment of the present invention for purposes of illustration only. One skilled in the art will readily recognize from the following discussion that alternative embodiments of the structures and methods illustrated herein may be employed without departing from the principles of the invention described herein.

Overview

Figure 1:
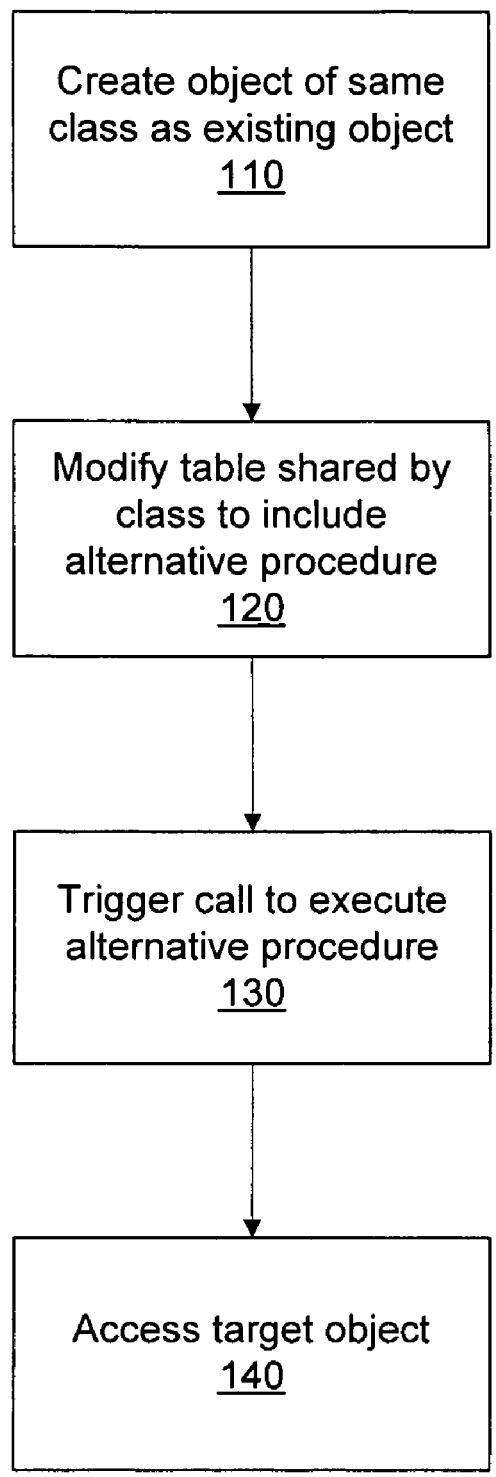
FIG. 1 is a flowchart illustrating a method of accessing a target object according to one embodiment of the present invention.

FIG. 1 is a flowchart illustrating a method of accessing a target object according to one embodiment of the present invention. This method is executed, for example, by a collection of software objects executing on a user's computer.

According to this embodiment, access to an object in a class associated with a desired functionality may be obtained. The method begins by creation 110 of an object of the same class as existing object. From an existing object of a class, an instance is created, resulting in an object of the same class. In some embodiments, preliminary steps precede the creation of the new object, for example injecting a process into a library, locating a window associated with the object, and/or creating a subclass of an existing window.

Next, a function table associated with the newly created object is modified 120. A function table stores references (e.g., handles, pointers, memory addresses) to methods or procedures of the class. Every class has associated with it one or more function tables that store these function references. When a new instance of a class is created, it holds a reference to at least one of the function tables; such function tables are called shared tables. Other function tables may be specific to an individual object. In one embodiment, the modification includes the replacement of an existing function reference in a shared function table with an alternative procedure, also known as a hook. In one embodiment, the replaced function is peripheral to the main functionality provided by the shared table. However, even a main function may be used, in which case the alternative procedure also would call the original function to minimize any side effects of the replacement. In one embodiment, the first few bytes of the implementation itself are patched rather than patching a shared table. In this example, the first five bytes are modified to include a jump instruction that sends control to an alternative procedure.

The alternative procedure may include multiple functions. The alternative procedure receives a direct or indirect reference to the target object, thereby allowing access to the target object where none was previously available. In one embodiment, the alternative procedure invokes a pointer it has received to allow direct access to the target object. In this example, the target object may be the original object. In another embodiment, the alternative procedure invokes a pointer to the original object and uses a method (e.g., the IUnknown::QueryInterface method) to get a second pointer to another (target) object. In yet another embodiment, the alternative procedure also directs a navigation of a contextual menu to programmatically emulate user actions (e.g., to simulate the user's actions in using the target object).

Because the original object and the newly created object are of the same class, they share the modified function table. Thus, calls to either the original or newly created objects will utilize the modified table, including the alternative procedure. In one embodiment, the shared table is a vtable, i.e., a structure in the header of every class object that contains the memory addresses of the actual code associated with the properties and methods implemented by the class. In one embodiment, an additional table also may be modified to include an alternative procedure, for example an import address table (IAT). After the shared function table is modified 120, a call is triggered 130 to execute the alternative procedure of the table. In one embodiment, the trigger occurs in the form of a message sent to the original, existing object, which causes the existing object to read the shard table, invoking the alternative procedure. In another embodiment, the message also programmatically initiates a context menu for the target object that includes selections related to the desired functionality; this will subsequently allow the end user to access specific methods and data associated with the target object. In yet another embodiment, the trigger causes the return of a command identifier of a function or access to a menu. In any of these methods, any pointer, command identifier, or access obtained may be stored in memory.

After the alternative procedure is executed and provides access to the target object, the target object or the methods of the object may then be accessed 140. For example, a method in an interface implemented by the target object may be invoked. Additional finishing steps may be made at this time as well, such as restoring tables to their initial state and/or unsubclassing windows, if any.

Figure 2:
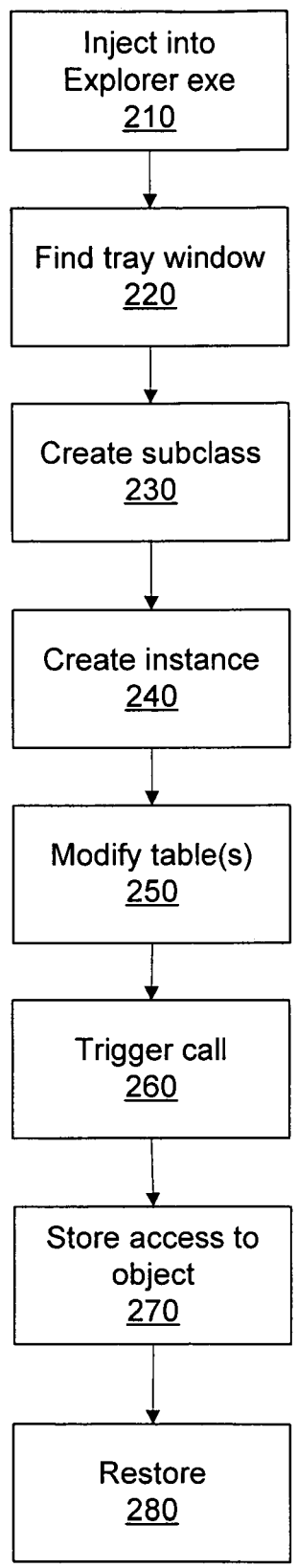
FIG. 2 is a flowchart illustrating an example of a method of accessing a target object according to one embodiment of the present invention.

FIG. 2 is a flowchart illustrating an example of a method of accessing a target object according to one embodiment of the present invention. In this example, the purpose of accessing the target object is to enable a deskband.

As a preliminary step, a dynamic load library (DLL) implementation is injected 210 into the Explorer.exe process in the Windows operating system (e.g., Windows 2000). This step can be accomplished by any of several means known in the art, for example, using CreateRemoteThread, SetWindowsHookEx, or Explorer-specific methods such as SHLoadInProc. Next, a tray window is found 220 that is known to include key functionality, in this example, a tray window necessary to enable deskbands. The tray window then is subclassed 230. Subclassing a window in this example means altering an existing window instance so that messages sent to the existing instance are first processed by the subclassed window, which delegates those messages is does not need to handle to the existing instance.

An object, or instance, of the same class as an existing object or instance is created 240 next. In this example, the class is associated with enabling a deskband. Then, a table associated with the newly created object or instance is modified 250, or patched, such that one of the functions in the table is replaced with an alternative procedure. In this embodiment, the table is a vtable shared by the objects of the class, including the original object or instance. Thus, by replacing a function with an alternative procedure to patch the vtable of one instance of the object, all instances will use the alternative procedure.

Next a call is triggered 260 that causes the table to be read. The trigger comes in the form of a WM_CONTEXTMENU message sent to the tray window, programmatically notifying the window that a right mouse button click has occurred in the window, although no click actually occurred. The message causes the existing object to read the shared table, invoking the alternative procedure, which returns access to an IBandSite object instance associated with deskband enablement. In this embodiment, the concept of aggregation and the QueryInterface method of the IUnknown interface are used to get access to the IBandSite object. The first parameter to the alternative procedure function is the "this" pointer to the object on which the function is being invoked (the existing object). Next, the alternative procedure calls QueryInterface on the "this" pointer to get to the IBandSite object. A reference to the IBandSite object, which is the target object in this example, is then stored 270. In additional steps, the IBandSite object or the methods of the object may then be accessed for the purposes of enabling a deskband, e.g., by calling IDeskBand::AddBand( ). Finally, the table may be restored 280 to its original state and the window unsubclassed. However, because access to the target object was stored, the target object remains accessible.

System Architecture

Figure 3:
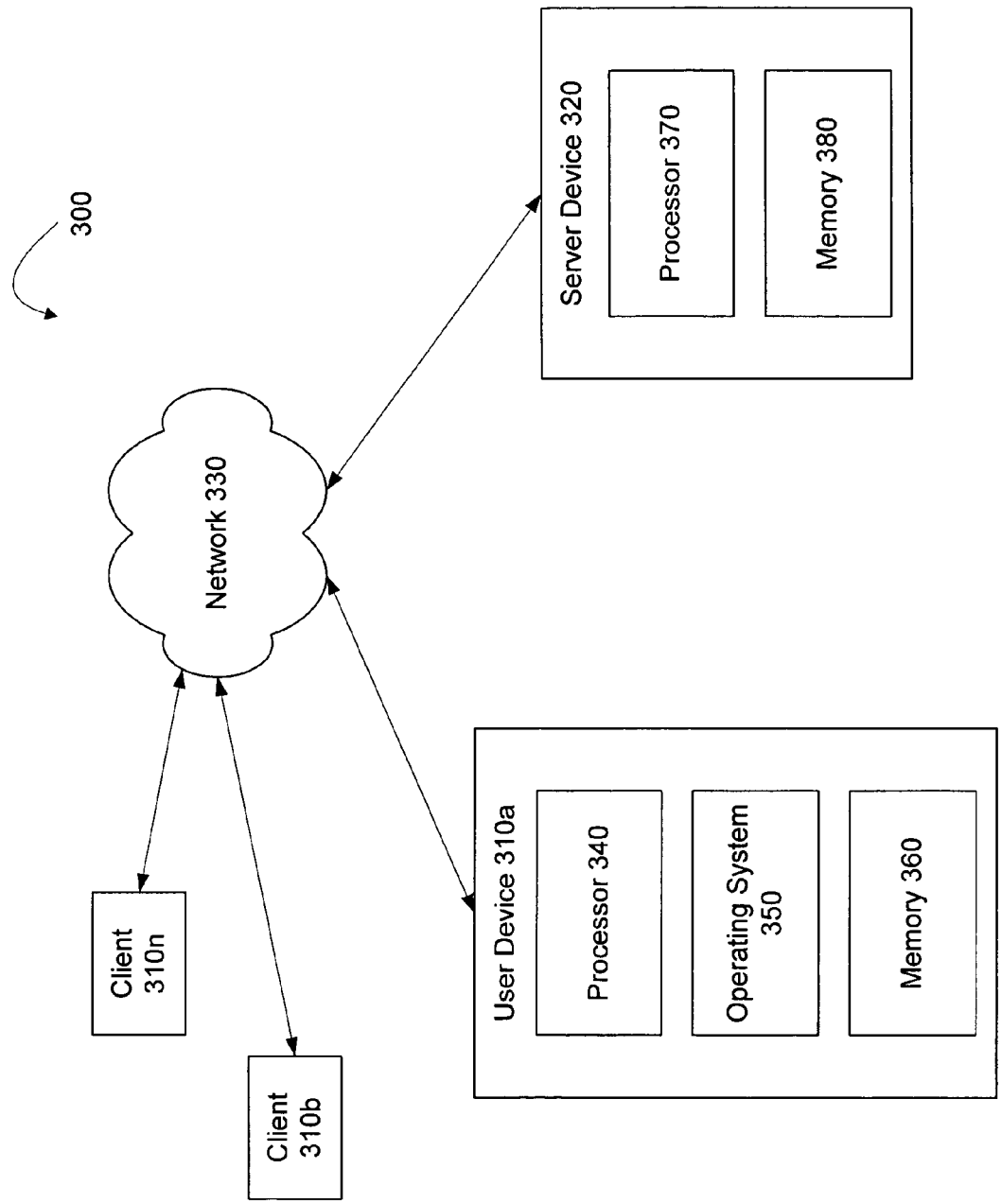
FIG. 3 is a block diagram illustrating a system for accessing a target object according to one embodiment of the present invention.

FIG. 3 is a block diagram illustrating a system for accessing a target object according to one embodiment of the present invention. The system 300 includes one or more user devices 310*a-n* that can communicate with a server device 320 over a network 330, e.g., the Internet. In other embodiments, other networks, such as a local area network (LAN), or the like, may be used instead. Moreover, in other embodiments, functions described with respect to a client or a server in a distributed network environment may take place within a single user device without a server device or a network. The implementation of these techniques as well as similar adaptations falls within the scope of this invention.

The user devices 310a-n each include a processor 340, an operating system 350, and a memory 360. In one embodiment, a user device 310a includes a random access memory (RAM) coupled to the processor 340. The processor 340 executes computer-executable program instructions stored in memory 360. Such processors may include a microprocessor, an ASIC, state machines, or other processors, and can be any of a number of suitable computer processors, such as processors from Intel Corporation of Santa Clara, Calif. and Motorola Corporation of Schaumburg, Ill. Such processors include, or may be in communication with, code modules (410-480 of FIG. 4), which store instructions that, when executed by the processor 340, cause the processor 340 to perform the steps described herein.

User devices 310a-n may be coupled to a network 330. User devices 310a-n also may include a number of external or internal devices such as a mouse, a CD-ROM, DVD, a keyboard, a display device, or other input or output devices. Examples of user devices 310a-n are personal computers, digital assistants, personal digital assistants, cellular phones, mobile phones, smart phones, pagers, digital tablets, laptop computers, Internet appliances, and other processor-based devices. In one embodiment, the user devices 310a-n may be any type of processor-based platform that operates on any suitable operating system 340, such as Microsoft® Windows® or Linux, and that are capable of executing one or more user application programs. For example, the user device 102a can include a personal computer executing user application programs.

Through the user devices 310a-n, users can communicate over the network 330, with each other and with other systems and devices coupled to the network 330. As shown in FIG. 3, a server device 320 can be coupled to the network 330. The server device 320 can include a server executing a search engine application program, such as the Google™ search engine. In other embodiments, the server device 320 can include a related information server or an advertising server. Similar to the user devices 310a-n, the server device 320 can include a processor 370 coupled to a computer-readable memory 380. Server device 320, depicted as a single computer system, may be implemented as a network of computer processors. Examples of a server device 320 are servers, mainframe computers, networked computers, a processor-based device, and similar types of systems and devices. The server processor 370 can be any of a number of computer processors, such as processors from Intel Corporation of Santa Clara, Calif. and Motorola Corporation of Schaumburg, Ill. In another embodiment, the server device 320 may exist on a client-device. In still another embodiment, there can be multiple server devices 320.

It should be noted that other embodiments of the present invention may include systems having different architecture than that which is shown in FIG. 3.

Figure 4:
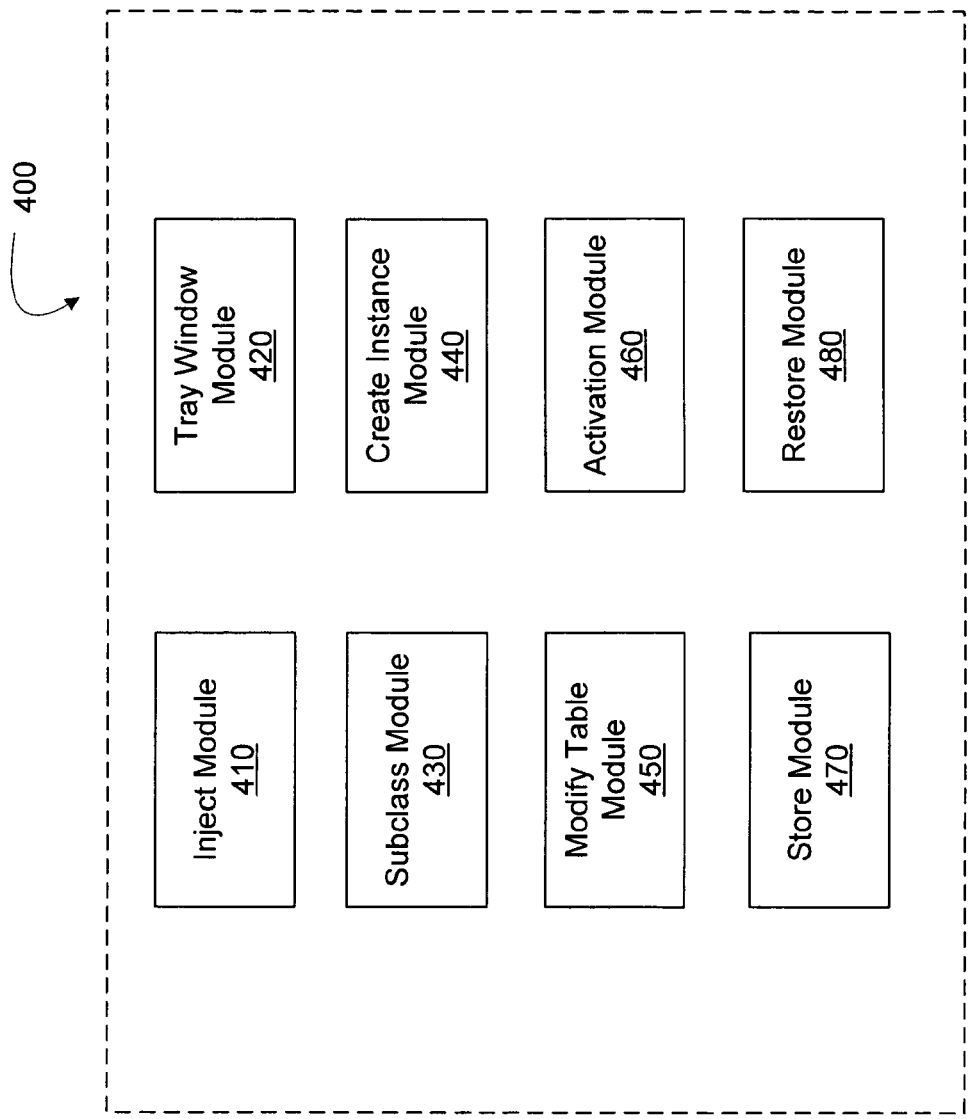
FIG. 4 is a block diagram illustrating code modules and memory storage areas for accessing a target object according to one embodiment of the present invention.

FIG. 4 is a block diagram illustrating code modules and memory storage areas for accessing a target object according to one embodiment of the present invention. Generally, several code modules and memory storage areas are stored in the memory 400 for enabling access to a target object.

The modules may be provided to user device 310 on computer readable media, such as a CD-ROM, diskette, or by electronic communication over a network 330 from software distributors, for installation and execution thereon. Alternatively, some modules can be hosted on a server device 320, and accessed over the network by the user, for example using a browser interface. Thus, the memory 400 (dotted line) is for illustration purposes only, and the modules may be stored in the memories 360, 380 of the user device 310, server device 320, or some combination thereof. In one embodiment, the modules are installed in memory 360 of the user device 310 upon the initiation of a download of an executable process over a network 330.

Specifically, the code modules and memory storage areas include an inject module 410, a preparation module 420, a create instance module 430, a modify table module 440, an activation module 450, a store module 460, an access module 470, and a restore module 480. The code modules and memory storage areas 410-480 may be communicatively coupled to each other.

The inject module 410 executes logic for injecting code into the Explorer.exe process by any of the methods described above for that purpose. The preparation module 420 executes logic for locating and subclassing a window useful for the desired functionality of the method according to one embodiment of the present invention.

The create instance module 430 executes logic for creating an object, or instance, of the same class as any existing object or instance. The modify table module 440 executes logic for modifying a table associated with an object. In one embodiment, the modification includes the replacement of an existing function in the table with an alternative procedure. In one embodiment, more than one table may be modified with more than one alternative procedure.

The activation module 450 executes logic for triggering a call that causes the alternative procedure of the table to execute, initiate, or otherwise activate. For example, the trigger may come in the form of a message that initiates a read of a table and an invocation of the alternative procedure or activates a contextual menu.

The store module 460 executes logic for storing access to objects and menus. The access module 470 executes logic for accessing objects and methods of objects. The restore module 480 executes logic for restoring windows and tables to a previous state. For example, an alternative procedure may be removed from a table and/or a window may be unsubclassed.

The above software portions 410-480 need not be discrete software modules. The configuration shown is meant only by way if example; other configurations are anticipated by and within the scope of the present invention.

EXAMPLES

Figure 5:
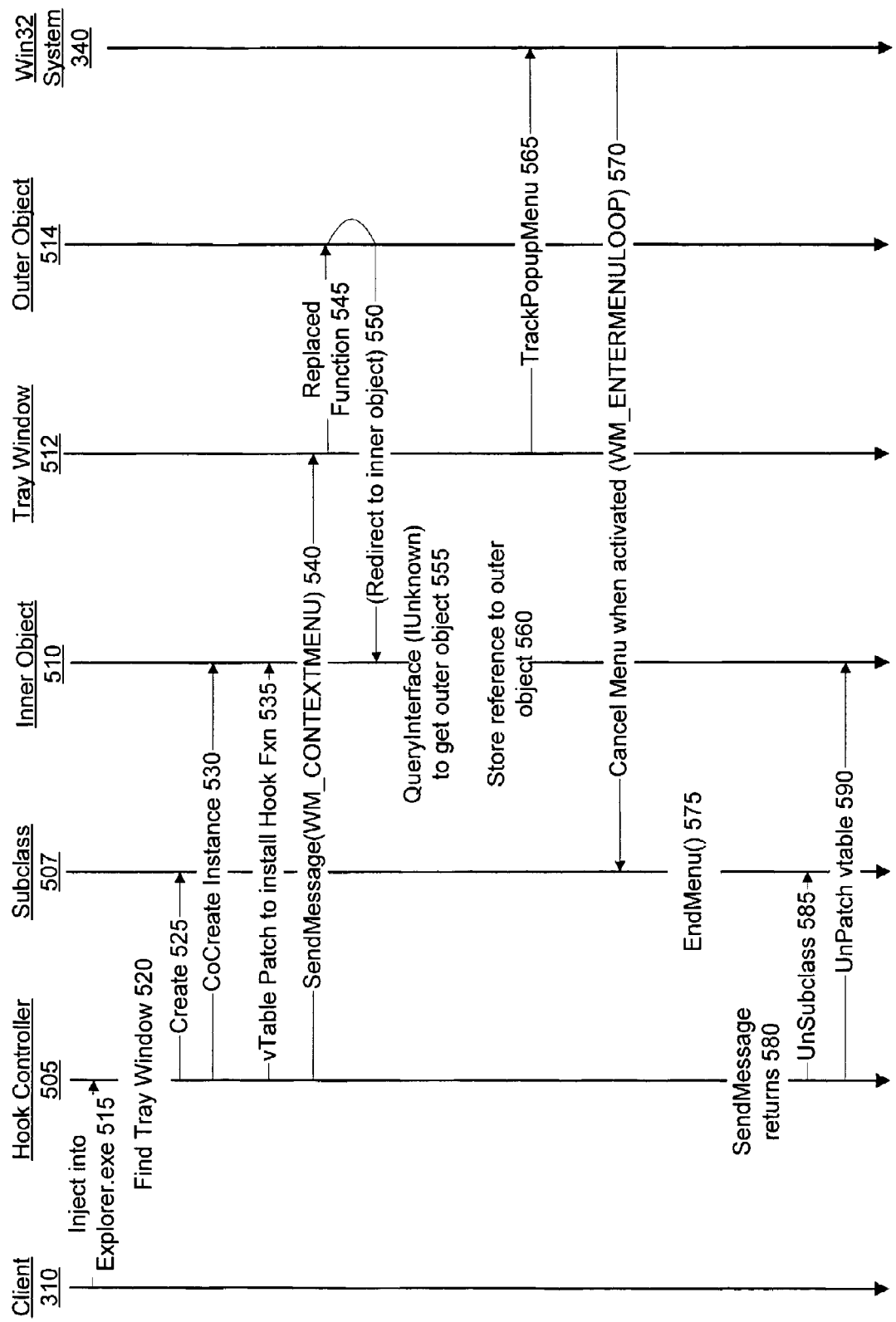
FIG. 5 is a sequence diagram showing an example implementation of the method of FIG. 1 according to one embodiment of the present invention.

FIG. 5 is a sequence diagram showing an example implementation of the method of FIG. 1 according to one embodiment of the present invention. This example describes one embodiment of a process for accessing a target object with desired functionality. The desired functionality according to this example is enabling a deskband.

The example implementation begins with a client object 310 that wants to enable a particular deskband. Initially, a dynamic load library (DLL) implementation is injected 515 into the Explorer.exe process in the Windows operating system, using any of the methods described herein for that purpose or any other well-known method. Next, a tray window 512 is found 520 that is known to include key functionality for enabling deskbands. In one embodiment, the tray window 520 includes an inner and outer IBandSite object. The IBandSite outer object allows deskband enablement. In this example, the tray window 520 class is Shell_TrayWnd. The tray window 520 then is subclassed 525. Next, an instance of the IBandSite inner object is created 530. In one embodiment, the instance is cocreated, which means that a single initialized object of the class associated with a specific CSLID is created. In this example, the inner object is found in browseui.dll and the CSLID is ECD4FC4D-521C-11D0-B792-00A0C90312E1 (Shell Rebar Band Site).

Next, the vtable is patched 535 by replacing one of the functions in the vtable of the instance with an alternative procedure or hook. By creating a patch in the vtable of one instance of the object, the (shared) vtable is patched for all objects of the class. In one embodiment, the IBandSite::EnumBands method is replaced with the alternative procedure. The EnumBands method is used to enumerate the bands in a bandsite is used in this example, but other methods could be used as well. The patch establishes an IBandSite hook, as the alternative procedure now is included in the vtable shared by all IBandSite instances. A WM_CONTEXTMENU message then is sent 540, via a SendMessage or PostMessage function, to the tray window. A WM_CONTEXTMENU message is a message that notifies a window, in this example the tray window, that the user clicked the right mouse button (right-clicked) in the window.

As a result of receiving the WM_CONTEXTMENU message, Explorer.exe creates a context menu that it intends to show. To populate the context menu, it needs to call the IBandSite::EnumBands function. It retrieves the pointer to this function from a specific position in the IBandSite vtable. Because the pointer in this position in the vtable has been replaced with a pointer to the alternative procedure, it instead receives 545 a pointer to the alternative procedure, which it then calls. The first parameter is the "this" pointer, as described above. The "this" pointer is a pointer to the inner IBandSite object, which the QueryInterface method can be called on to retrieve the IUnknown interface. In one embodiment, the outer and inner IBandSite objects have a containment/delegation relationship. The outer object is said to contain the inner object. Thus, when methods of the outer object are called, the outer object delegates the implementation to the inner object's methods. In addition, the relationship between the inner and outer objects is a specialized case of containment and delegation known as aggregation, in which the outer object exposes interfaces from the inner object as if they were its own. Due to the rules of COM aggregation, QueryInterface on an inner aggregated object will always return the pointer to the IUnknown interface of the outer object, from which any other COM interface implemented by the outer object can be retrieved, including in this case IBandSite. Therefore, the function that is invoked with respect to the outer object is redirected 550 to the inner object. The replaced function of the inner object then uses the QueryInterface method of the IUnknown interface to get 555 a pointer to the outer object. Specifically, the inner object acts as a client to the outer object and calls QueryInterface to ask the outer object for an interface for the desired operations. Assuming the outer object accepts the request, it returns a new pointer to the requested object. The reference to the outer IBandSite object then is stored 560.

In one embodiment, the tray window then causes Explorer to call 565 TrackPopupMenu function to the Win32 System 340, in response to the WM_CONTEXTMENU message. The Win32 system 340 is the Windows programming platform implemented by Windows 95 and later and Windows NT 3.51 and later. In this example, TrackPopupMenu is used, which displays a shortcut menu at the specified location and tracks the selection of items on the menu. The menu is then cancelled 570 in the tray window subclass 507 when activated. In one embodiment, this is accomplished by handling the WM_ENTERMENULOOP message, which informs the window procedure that a menu modal loop has been entered. The subclass 507 then calls 575 the EndMenu( ) function to end the calling thread's active menu and SendMessage returns 580, indicating that the window procedure has processed the message. The tray window 512 then may be unsubclassed 585 and the shared table unpatched 590.

Figure 6:
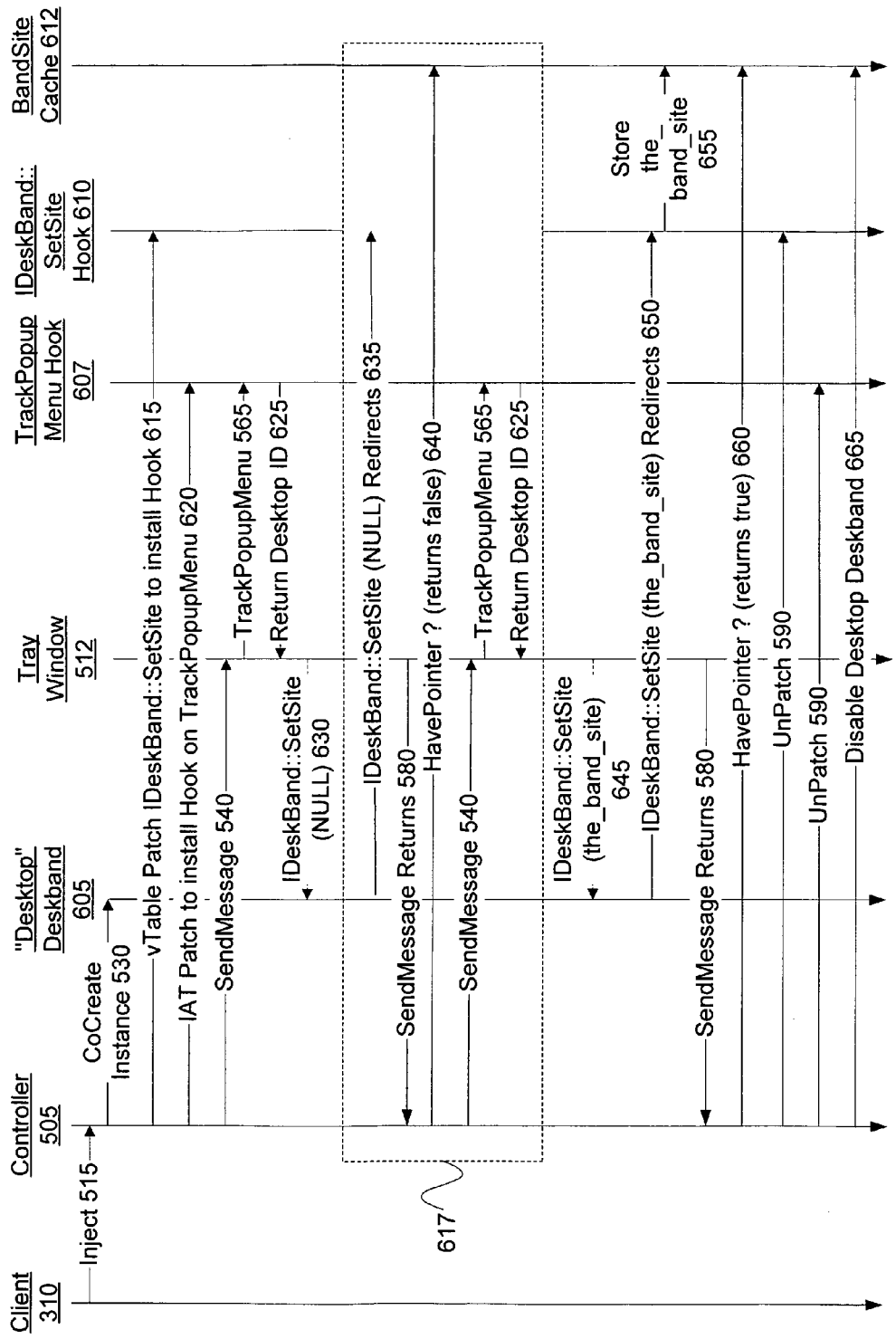
FIG. 6 is a sequence diagram showing an example implementation of the method of FIG. 1 according to one embodiment of the present invention.

FIG. 6 is a sequence diagram showing an example implementation of the method of FIG. 1 according to one embodiment of the present invention. This example describes one embodiment of a process for accessing a target object with desired functionality. The desired functionality according to this example includes enabling a deskband.

The example implementation begins with a client object 310 that wants to enable a particular deskband. The basic premise of this example implementation is to use the known object that implements the Desktop and QuickLaunch deskbands, which are always present in the shell's context menu, to create a new deskband. Initially, a dynamic load library (DLL) implementation is injected 515 into Explorer.exe as described in conjunction with FIG. 5. Next, an instance of the Desktop deskband 605 object is created 530 using CoCreateInstance.

The vtable associated with the instance is then patched 615 by replacing one of its functions with an alternative procedure or hook 610. In one embodiment, the IDeskBand::SetSite method is replaced with the first hook function. This step intercepts the method and places the first hook function into all instances of the Desktop deskband object. Next a second hook 607 is created 620 on a TrackPopupMenu function using an Import Address Table (IAT). An IAT is a table of jump instructions, with each entry instructing the processor to jump to the actual implementation of the function. A WM_CONTEXTMENU message then is sent 540, via a SendMessage or PostMessage function, to the tray window. Next Explorer attempts to call TrackPopupMenu, however, the IAT patch directs 565 a jump to the TrackPopupMenu hook 607 rather than a jump to the original function. Then the command identifier of the Desktop deskband is returned 625 to the tray window 512.

As a result, Explorer will create and initialize the Desktop deskband object. As part of the initialization process, the IDeskBand::SetSite method is called is provided with either a null pointer 630 or a pointer to Explorer's IBandSite instance 645. The result depends on whether the Desktop deskband is initially enabled (null 630) or disabled (the_band_site 645). The status of the Desktop deskband is unknown the function is initially called. If a null pointer 630 is supplied, the following steps, outlined by dotted box 617, occur. First, the IDeskBand::SetSite (null) is redirected 635 due to the IDeskBand::SetSite hook 610. Then, the SendMessage returns 580, indicating that the window procedure has processed the message. Next, HavePointer is called and returns false 640. A WM_CONTEXTMENU message is sent 540 a second time and the IAT patch directs 565 a jump to the TrackPopupMenu hook 607 as above. Then the command identifier of the Desktop deskband is returned 625 to the tray window 512 a second time.

If instead the Desktop deskband was disabled initially, or following the above steps for a null result, the IDeskBand::SetSite method is called and a pointer to Explorer's IBandSite instance is provided as one of its parameters 645. As in step 635, the IDeskBand::SetSite (the_band_site) result then redirects 650. The pointer to Explorer's IBandSite instance is stored 655 in a BandSite cache 612.

The SendMessage again returns 580, indicating that the window procedure has processed the (second WM_CONTEXTMENU) message. Next, HavePointer again is called and this time returns true 660. The vtable and IAT are then unpatched 590, restoring them to their original state. Finally, if the Desktop deskband was disabled initially and a null result never returned, the Desktop deskbar is disabled 665 to return it to its previous state. This step is accomplished using a IBandSite::HideBand method. This disable step (665) does not occur if the Desktop deskband was enabled initially.

Figure 7:
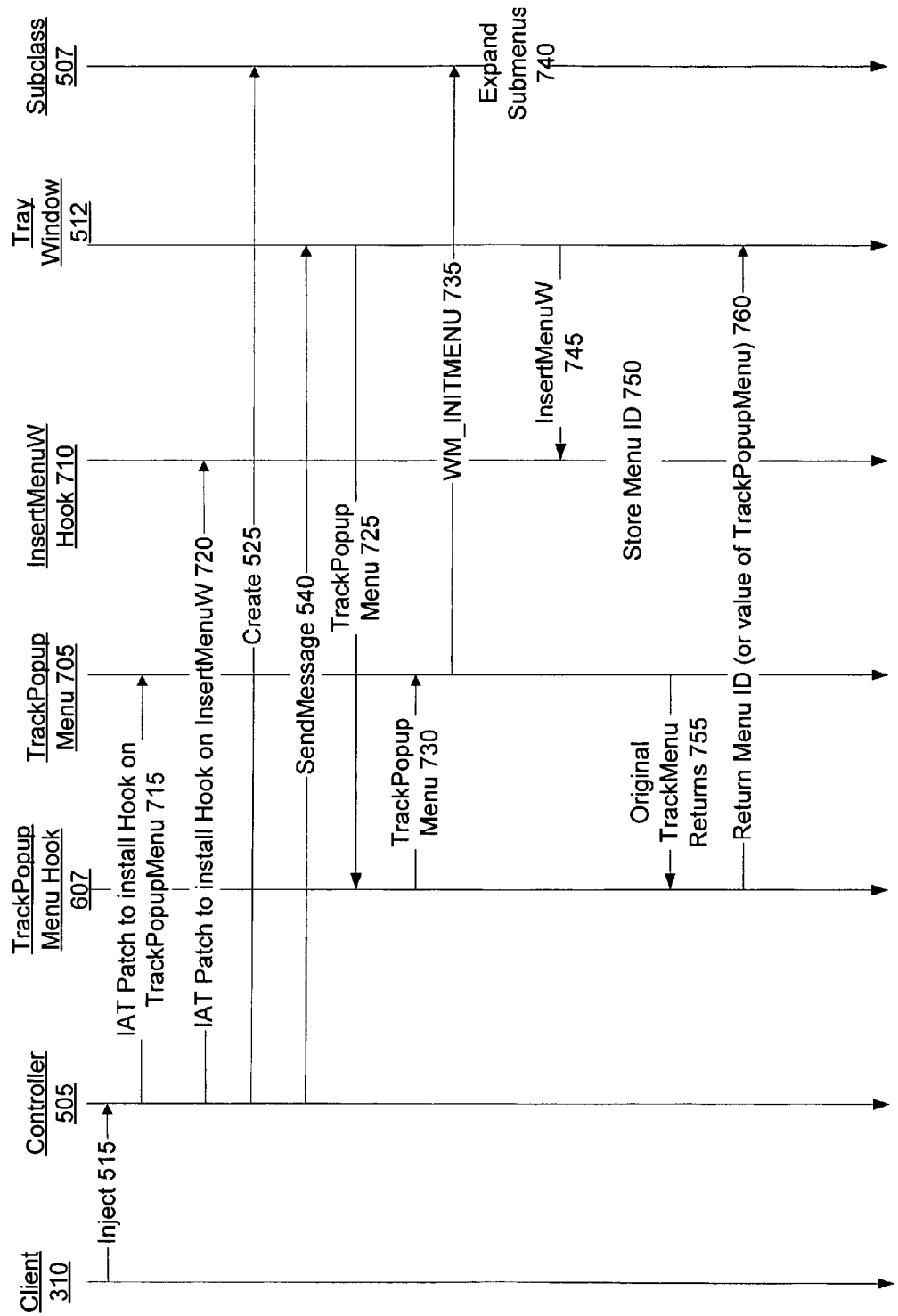
FIG. 7 is a sequence diagram showing an example implementation of the method of FIG. 1 according to one embodiment of the present invention.

FIG. 7 is a sequence diagram showing an example implementation of the method of FIG. 1 according to one embodiment of the present invention. This example describes one embodiment of a process for accessing a target object with desired functionality. The desired functionality according to this example includes enabling a deskband.

The example implementation begins with a client object 310 that wants to enable a particular deskband. This implementation works in part by programmatically emulating user actions and in part by hooking standard Win32 APIs. Initially, a dynamic load library (DLL) implementation is injected 515 into Explorer.exe. Next, a first hook 607 is created 715 on a TrackPopupMenu function by patching an Import Address Table (IAT). This hook 705 allows a change in the return value of the function so that it returns the identifier of the item desired to toggle (enable or disable). Then a second hook 710 is created 720 on an InsertMenuW function by again patching the IAT. The InsertMenuW function inserts a new menu item into a menu, moving other items down the menu. This hook allows the item identifier to be seen when Explorer dynamically inserts it in a submenu of the popup menu.

Next the tray window 512 is subclassed 525 that is the owner of the popup dialog used to manually enable and disable deskbar items. A WM_CONTEXTMENU message then is sent 540 to the tray window 512, via a SendMessage or PostMessage function, to cause it to show the popup menu. As a result, the TrackPopupMenu function is called 725 and redirected 730 due to the TrackPopoupMenu Hook 607. The popup menu is then initialized 735 using a WM_INITMENU message.

Next, keypresses are programmatically simulated to expand 740 all submenus. For example, a DOWN keypress is used to navigate down the menu, a RIGHT keypress is used to navigate into menu items that are submenus. In one embodiment, every time a RIGHT keypress is sent, a message is posted (via PostMessage) and control is returned to Explorer. When the posted message is received, a left keypress is sent to close the submenu and continue navigating the menu until the entire top-level menu has been traversed. This step 740 forces Explorer to populate the submenus, which it does using InsertMenuW, thus triggering 745 the InsertMenuW hook with the identifier of the deskband menu of the deskband being enabled. As a result, the command identifier of the item to toggle is returned. This menu identifier is stored 750.

Then the original TrackPopupMenu returns 755. Finally, the new deskband's menu identifier is returned 760, assuming the menu identifier was found. This causes Explorer to toggle the display state of the new deskband, e.g., enabling it. However, if the store menu identifier was not found by the InsertMenuW hook function, the value of the original TrackPopupMenu function is returned in step 760.

Figure 8:
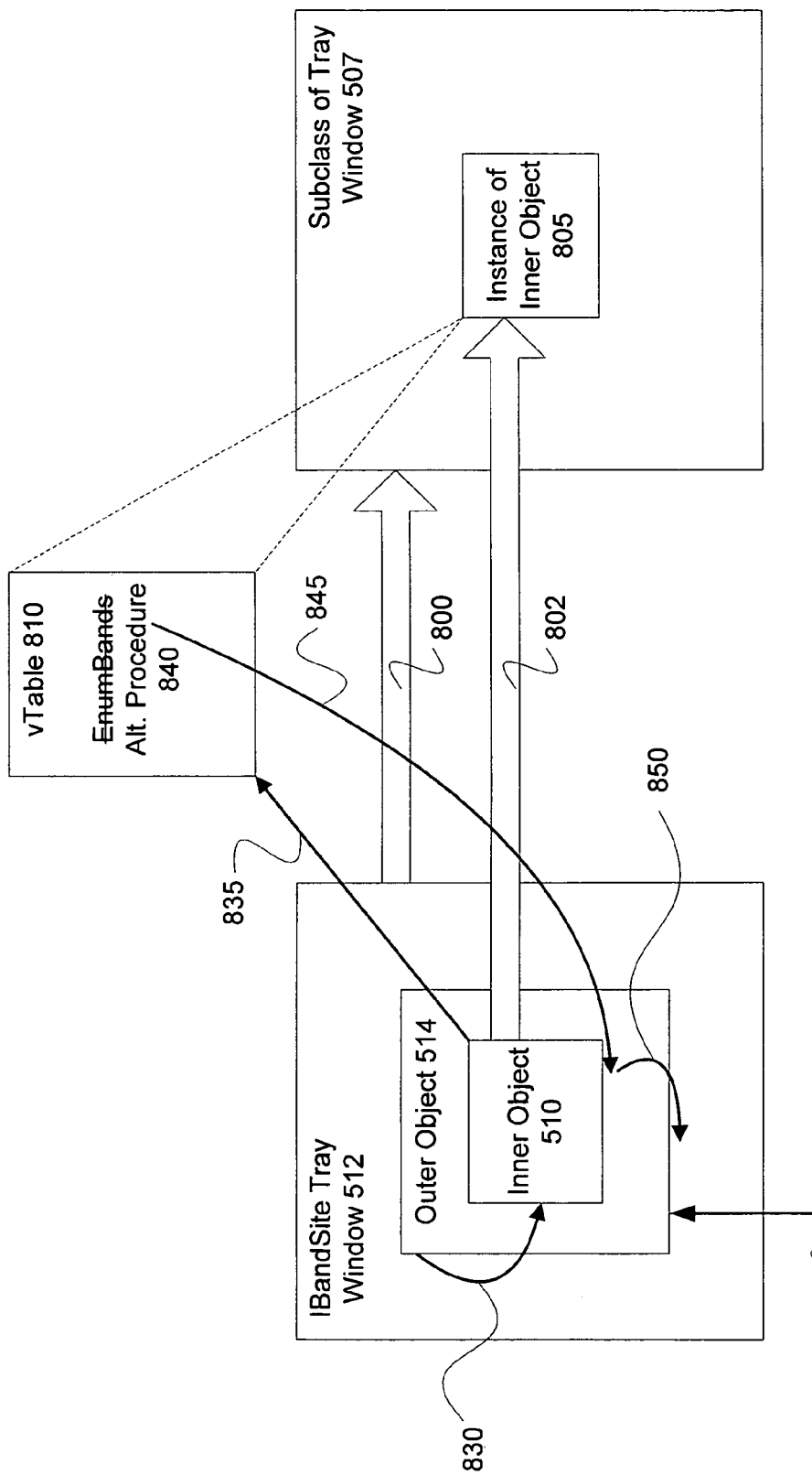
FIG. 8 is a schematic representation of the example implementation of FIG. 5 according to one embodiment of the present invention.

FIG. 8 is a schematic representation of the example implementation of FIG. 5 according to one embodiment of the present invention. This example describes one embodiment of the example implementation in conjunction with the process of user installation of a deskbar.

In one embodiment, the process begins when a user accesses a website, for example over network 330, to install an executable process to install a deskband. After agreeing to a set of terms, the user clicks an icon on his screen to begin a download of the executable. This step causes an installation program to run, installing software modules, e.g., 410-480 as described in conjunction with FIG. 4. In this example, the installation program executes an implementation, for example as illustrated in FIGS. 5 and 8.

After some preliminary steps, such as injecting code into Explorer.exe as described in conjunction with FIG. 5, the IBandSite tray window 512 is found and subclassed 800 to create subclass 507 as shown in FIG. 8. Then, an object or instance 805 is created 802 of the same class as inner object (or instance) 510. The vtable 810 of inner object instance 805 is then modified to replace 840 the EnumBands function with an alternative procedure.

Then, a call 825 via message 540 to outer object 514 is redirected 830 to inner object 510, causing the vtable 810 to be read 835. Note that because inner object instance 510 and the other instance of the inner object 805 are of the same class, they share the vtable 810. The read results in activation of the alternative procedure, which has received 845 a "this" pointer to the inner object 510, and using IUnknown::QueryInterface 850 of the pointer, a pointer to the outer object 514. Additional steps may occur as well, such as storing a reference to the outer object 514, restoring the vtable 810 to its previous state, and unsubclassing the tray window 512. As a result of these steps, the reference to the target object can be used to install a deskbar by calling IDeskBand::AddBand( ), causing the new deskband to display on the user's device.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as processing or computing or calculating or determining or displaying or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware, or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A method of accessing a target object that is not directly accessible through an operating system application programming interface, the method comprising:
   creating a first object having the same class as an existing object, the class associated with a desired functionality;
   modifying a table of procedures shared by the first object and the existing object, by replacing a table entry with an alternative procedure, the alternative procedure configured to provide access to the target object;
   triggering a call that causes execution of the alternative procedure in the table; and
   accessing the target object.

2. The method of claim 1, further comprising:
   prior to creating a first object, subclassing a tray window including the existing object.

3. The method of claim 1, further comprising:
   storing a reference to the target object.

4. The method of claim 1, further comprising:
   restoring the table of procedures shared by the first object and the existing object.

5. The method of claim 1, further comprising:
   canceling execution of the triggered call.

6. The method of claim 1, wherein providing access to the target object comprises receiving and storing a reference to the target object.

7. The method of claim 1, wherein accessing comprises invoking a method in an interface implemented by the target object.

8. The method of claim 7, wherein the method in the interface comprises a method to enable a deskband.

9. The method of claim 1, wherein the target object is the existing object.

10. The method of claim 1, wherein the existing object is an inner object in an aggregation relationship of one or more layers with the target object.

11. The method of claim 1, wherein the table is a vtable.

12. The method of claim 1, wherein the table is an import address table.

13. The method of claim 1, wherein the one or more alternative procedures invokes a pointer to the existing object and uses the IUnknown::QueryInterface method get a second pointer to the target object.

14. The method of claim 1, wherein the one or more alternative procedures directs a navigation of a contextual menu.

15. A method of accessing a target object that is not directly accessible through an operating system application programming interface, the method comprising:
   injecting a dynamic load library implementation into an Explorer.exe process in a Windows operating system;
   finding a tray window known to include functionality for enabling deskbands;
   creating a subclass of the tray window;
   creating a first object having the same class as an existing IBandSite inner object, the IBandSite inner object associated with deskband enablement;
   patching a vtable shared by the first object and the existing object by replacing a function in the vtable with an alternative procedure;
   sending a WM_CONTEXTMENU message to the tray window, the message causing the existing object to read the shared vtable, invoking the alternative procedure, the alternative procedure providing a reference to the inner IBandSite object and using a IUnknown::QueryInterface method to get a reference to an outer IBandSite object; and
   storing the reference to the outer IBandSite object.

16. A method of accessing a deskband enabling object that is not directly accessible through an operating system application programming interface, the method comprising:
   creating a first object having the same class as an existing object, the class associated with deskband enablement;
   modifying a table of procedures shared by the first object and the existing object, by replacing a table entry with an alternative procedure, the alternative procedure configured to provide access to the deskband enabling object; and
   triggering a call that causes execution of the alternative procedure in the table;
   accessing the deskband enabling object.

17. The method of claim 16, wherein the existing object implements Desktop and QuickLaunch deskbands.

18. The method of claim 16, further comprising:
prior to creating a first object, subclassing a tray window including the existing object.

19. The method of claim 16, further comprising:
storing a reference to the deskband enabling object.

20. The method of claim 16, wherein providing access to the deskband enabling object comprises receiving and storing a reference to the deskband enabling object.

21. The method of claim 16, wherein accessing comprises invoking a method in an interface implemented by the deskband enabling object.

22. The method of claim 21, wherein the method in the interface comprises a method to enable a deskband.

23. A method of accessing a target object that is not directly accessible through an operating system application programming interface, the method comprising:
modifying a table associated with a function by replacing a table entry with an alternative procedure, the alternative procedure configured to programmatically emulate user actions to provide access to the target object;
triggering a call that causes execution of the alternative procedure in the table;
accessing the target object.

24. A computer program product for accessing a target object that is not directly accessible through an operating system application programming interface, the computer program product comprising:
a computer-readable medium; and
computer program code, coded on the medium, for:
creating a first object having the same class as an existing object, the class associated with a desired functionality;
modifying a table shared by the first object and the existing object, by replacing a table entry with an alternative procedure, the alternative procedure configured to provide access to the target object;
triggering a call that causes execution of the alternative procedure in the table; and
accessing the target object.

25. A system for accessing a target object that is not directly accessible through an operating system application programming interface, the system comprising:
a processor;
means for creating a first object having the same class as an existing object, the class associated with a desired functionality;
means for modifying a table shared by the first object and the existing object, by replacing a table entry with an alternative procedure, the alternative procedure configured to provide access to the target object;
means for triggering a call that causes execution of the alternative procedure in the table; and
accessing the target object.

26. A system for accessing a target object that is not directly accessible through an operating system application programming interface, the system comprising:
a processor;
a software portion configured to create a first object having the same class as an existing object, the class associated with a desired functionality;
a software portion configured to modify a table shared by the first object and the existing object by replacing a table entry with an alternative procedure, the alternative procedure configured to provide access to the target object;
a software portion configured to trigger a call that causes execution of the alternative procedure in the table; and
a software portion configured to enable access the target object.

* * * * *

UNITED STATES PATENT AND TRADEMARK OFFICE
CERTIFICATE OF CORRECTION

PATENT NO. : 7,644,416 B2 Page 1 of 1
APPLICATION NO. : 11/057322
DATED : January 5, 2010
INVENTOR(S) : Sigurdsson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1366 days.

Signed and Sealed this

Sixteenth Day of November, 2010

David J. Kappos
*Director of the United States Patent and Trademark Office*